(12) United States Patent
Worsley

(10) Patent No.: US 9,521,032 B1
(45) Date of Patent: Dec. 13, 2016

(54) SERVER FOR AUTHENTICATION, AUTHORIZATION, AND ACCOUNTING

(71) Applicant: Amazon Technologies, Inc., Reno, NV (US)

(72) Inventor: Timothy Craig Worsley, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 366 days.

(21) Appl. No.: 13/829,383

(22) Filed: Mar. 14, 2013

(51) Int. Cl.
| | |
|---|---|
| *G06F 15/173* | (2006.01) |
| *H04L 12/24* | (2006.01) |
| *G06F 21/30* | (2013.01) |
| *H04L 29/06* | (2006.01) |
| *G06F 21/31* | (2013.01) |

(52) U.S. Cl.
CPC .............. *H04L 41/00* (2013.01); *G06F 21/30* (2013.01); *G06F 21/31* (2013.01); *H04L 63/0892* (2013.01); *H04L 63/101* (2013.01); *H04L 63/20* (2013.01)

(58) Field of Classification Search
CPC ........ G06F 21/31; G06F 21/30; H04L 63/101; H04L 63/20; H04L 63/0892
USPC ......................................................... 709/225
See application file for complete search history.

(56) References Cited

U.S. PATENT DOCUMENTS

| 6,195,682 B1 * | 2/2001 | Ho et al. ........................ 709/203 |
|---|---|---|
| 6,219,790 B1 * | 4/2001 | Lloyd et al. .................... 726/14 |
| 6,745,333 B1 * | 6/2004 | Thomsen ............ H04L 12/2602 |
| | | 713/160 |
| 7,587,763 B2 * | 9/2009 | Yodaiken ................ G06F 21/55 |
| | | 709/224 |
| 7,668,954 B1 * | 2/2010 | Melvin ......................... 709/224 |
| 8,064,882 B2 * | 11/2011 | Shatzkamer et al. ......... 455/411 |
| 8,621,065 B1 * | 12/2013 | Saurel et al. ................. 709/224 |
| 8,971,538 B1 * | 3/2015 | Marr ..................... H04L 63/145 |
| | | 380/285 |
| 2002/0133707 A1 * | 9/2002 | Newcombe .................... 713/183 |
| 2003/0051041 A1 * | 3/2003 | Kalavade et al. ............ 709/229 |
| 2003/0188161 A1 * | 10/2003 | Ndiaye ......................... 713/168 |
| 2003/0217285 A1 * | 11/2003 | Sanchez Herrero et al. 713/200 |
| 2004/0059926 A1 * | 3/2004 | Angelo .................... G06F 21/10 |
| | | 713/189 |
| 2005/0071445 A1 * | 3/2005 | Siorek ..................... H04L 43/18 |
| | | 709/223 |
| 2006/0235796 A1 * | 10/2006 | Johnson et al. ................. 705/44 |
| 2007/0150737 A1 * | 6/2007 | Parupudi et al. ............. 713/175 |

(Continued)

*Primary Examiner* — James Conaway
(74) *Attorney, Agent, or Firm* — Lee & Hayes, PLLC

(57) ABSTRACT

In some implementations, a client device includes a client identifier embedded into a firmware of the client device. A server may register a service with a global authentication, authorization, and account (AAA) server. The client device may request permission to access the service. The request may be signed using a client signature that is based on the identifier. The global AAA server may send the request to the server and the server may determine whether to grant the client device permission. If the global AAA server determines that the server has granted the client device permission, the global AAA server may provide server credentials to the client device and client credentials to the server. The client device may sign a request to connect to the service using the client signature. The server may grant the request in response to authenticating the request using the client signature.

20 Claims, 8 Drawing Sheets

(56) References Cited

U.S. PATENT DOCUMENTS

| | | | |
|---|---|---|---|
| 2008/0244078 A1* | 10/2008 | Viljoen et al. | 709/229 |
| 2008/0317002 A1* | 12/2008 | Boppana | H04L 69/32 370/352 |
| 2010/0058447 A1* | 3/2010 | Wang | 726/4 |
| 2010/0071032 A1* | 3/2010 | Durham | H04L 63/0209 726/2 |
| 2010/0088519 A1* | 4/2010 | Tsuruoka et al. | 713/176 |
| 2011/0078791 A1* | 3/2011 | Prakash | G06F 17/30265 726/22 |
| 2011/0115643 A1* | 5/2011 | Gilbert | G01D 4/008 340/870.09 |
| 2012/0317661 A1* | 12/2012 | Yamaguchi et al. | 726/32 |
| 2013/0163417 A1* | 6/2013 | Gupta | 370/230 |
| 2013/0173736 A1* | 7/2013 | Krzeminski et al. | 709/213 |
| 2013/0290711 A1* | 10/2013 | Rajkumar et al. | 713/168 |
| 2014/0150095 A1* | 5/2014 | Zhao et al. | 726/22 |
| 2016/0019050 A1* | 1/2016 | Marr | G06F 21/572 717/172 |

* cited by examiner

SERVER FOR AUTHENTICATION, AUTHORIZATION, AND ACCOUNTING

BACKGROUND

Organizations may have multiple computing devices connected via one or more networks. Such an organization may enable computing devices not associated with the organization to access the organization's network. For example, an organization may enable computing devices of clients and/or suppliers to access portions of the organization's network. In addition, some of the computing devices associated with the organization may have access to networks other than the organization's networks, such as the networks of clients or suppliers.

Some of the challenges faced by organizations include controlling which computing devices are allowed access to which services, and how much of the services the computing devices use. For example, the organization may desire to determine whether a client device is communicating with an appropriate (e.g., authorized) server, whether the client device is authorized to communicate with the server, and the like.

In a conventional system, each service provider may maintain lists identifying which client devices are authorized to access services offered by the service provider (e.g., whitelist) and/or which client devices are not authorized (e.g., blacklist). However, having each service provider maintain their own whitelists and/or blacklists may result in redundancy and duplicated effort.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
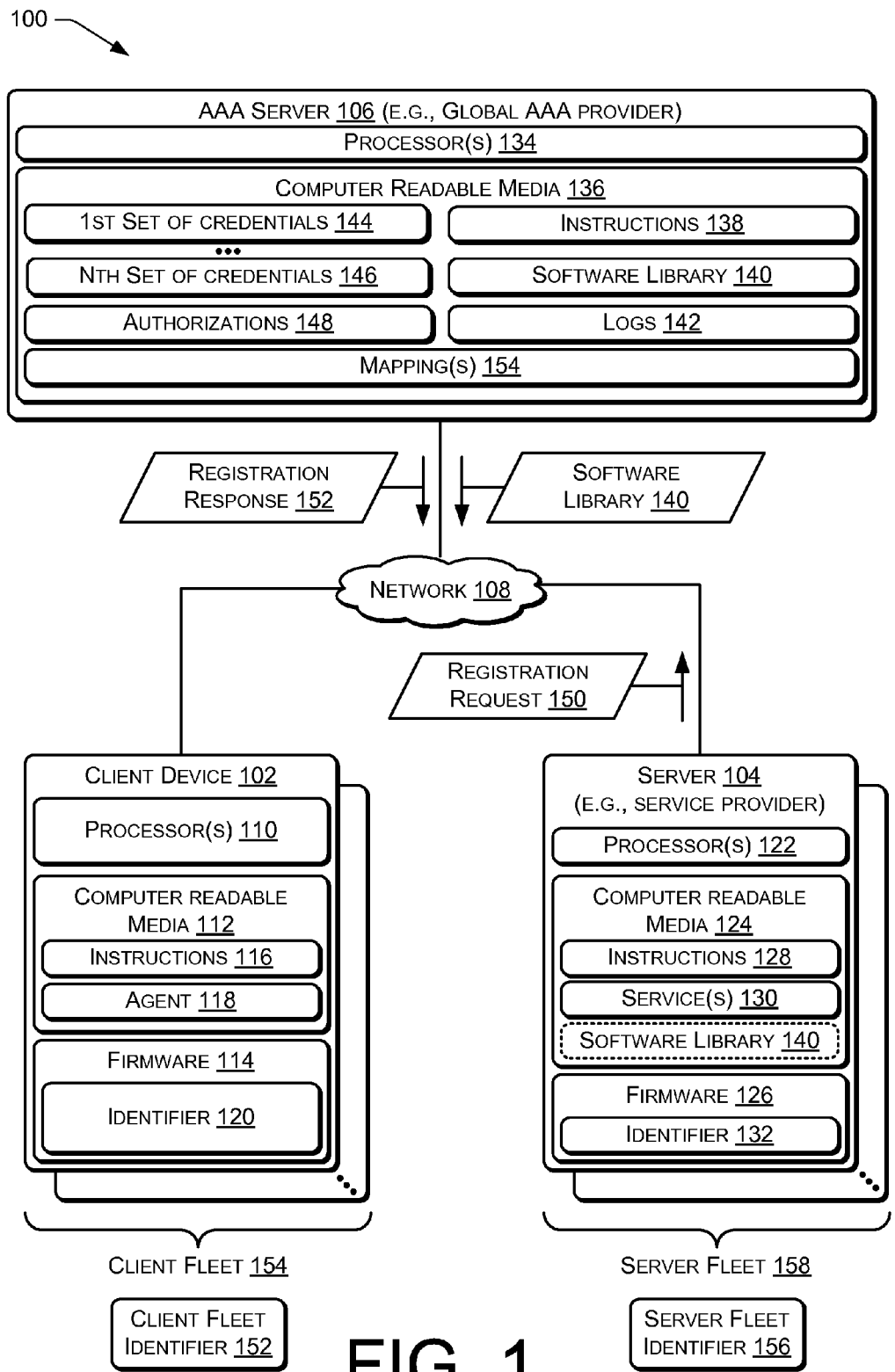
FIG. 1 is a block diagram illustrating a system that includes a server registering with an authentication, authorization, and accounting (AAA) server according to some implementations.

This disclosure describes systems, devices, and techniques that may be used to control operations between client devices and service providers. For example, an authentication, authorization, and accounting (AAA) server may maintain whitelists and blacklists associated with client devices may access which services. The AAA server may enable client devices to establish and maintain ongoing relationships with services. For example, the AAA server may perform various functions, including verifying (e.g., authenticating) an identity of each client device and each service provider, registering services provided by service providers to offer a central location for client devices to request permission to access services, providing client devices permission to perform a limited number of actions (e.g., authorizing), and monitoring and analyzing (e.g., accounting) ongoing communications between the client devices and services.

The AAA server may be used to control the services offered by service providers and which client devices are permitted to access the services. For example, a service provider (e.g., a server) offering a service to client devices may send a request to the AAA server to register the service. The AAA server may authenticate an identity of the service provider. For example, a firmware of a component of the service provider (e.g., server device) may include a unique identifier. The unique identifier may protect against a spoof attack. The unique identifier may uniquely identify the service provider from other computing devices. If the AAA server successfully authenticates the service provider using the unique identifier, the AAA server may register the service. If the AAA server is unsuccessful in authenticating the service provider, the AAA server may perform one or more protective actions, such as blacklisting the service provider. The term "blacklist" refers to a list that includes the identities of devices that are unauthorized to access a specified service. The term "whitelist" refers to a list that includes the identities of devices that are authorized to access a specified service.

When a client device desires to access the service, the client device may send a request to the AAA server requesting permission to access the service. The AAA server may authenticate an identity of the client device. For example, a firmware of a component of the client device may include a unique identifier that cannot be spoofed and that uniquely identifies the client device from other computing devices. If the AAA server is unsuccessful in authenticating the client device, the AAA server may decline the access request and perform one or more protective actions (e.g., blacklisting the client device etc.). If the AAA server successfully authenticates the client device, in some implementations, the AAA server may automatically (e.g., without human interaction) whitelist the client device for the service. In other implementations, after successfully authenticating the client device, the AAA server may send a notification to the service provider indicating that the client device is requesting access to the service, and the service provider may determine whether to allow the client device to access the service and instruct the AAA server accordingly. For example, if the service provider instructs the AAA server to enable the client device to access the service, the AAA server may whitelist the client device for the service. If the service provider instructs the AAA server to deny the client device access to the service, the AAA server may blacklist the client device for the service.

After a client device is whitelisted to access a service, when the client device desires to access the service, the client device may request access to the service by sending a request to the AAA server. For example, the AAA server may provide credentials to the client device for the client device to use when signing requests to the service. The AAA server may monitor when the client device accesses the service and may log information associated with the access. For example, the AAA server may log information such as when the client device accesses the service, how often the client device access the service, how long the client device connects to the service, etc. The logs may be used to optimize the allocation of resources such as services and service providers, detect client devices that are abusing or misusing access by hogging resources, and the like.

Each computing device (e.g., client devices and servers) may include identity information that is stored at a very low level (e.g., in firmware) of the computing device. For example, the identity information may be stored in the firmware of the computing device when the computing device is initially provisioned. Such a protection scheme may not be easily circumvented because the credentials to enable access to the secured data are not stored on the computing device or in a memory of a user. In addition, the server may be notified if a computing device is lost or stolen and the server may not provide credentials to computing devices that have been identified as lost or stolen. The identifier may be used as a key (e.g., credential) or a part of a key or other credential.

In some implementations described herein, the firmware of a computing device (or a component of the computing device) may be customized to contact an authorization server periodically (e.g., each time the computer device boots up) to enable the authorization server to authenticate an identity of the computing device, and/or to obtain authorization for continued operations of the computer device. For example, a firmware of a network interface controller (NIC) of the computing device may include a unique identifier. In addition, the NIC may monitor all incoming and outgoing communications between the computing device and external devices and/or systems. The authorization server may maintain a database (e.g., a central registry) of authorized computers, and may limit authorization to computing devices that are included in the registry based on an identity of each computing device. If a computing device is lost or stolen, the identity of the computing device may be removed from the central registry so that the computing device is unable to obtain authorization or credentials from the authorization server.

Upon failure to authenticate with and/or obtain authorization from the authorization server, the firmware may be configured to implement security measures within the computing device or with respect to individual peripherals of the computing device. Such security measures may include refusing to boot the computing device, refusing access to certain peripherals, erasing or destroying a storage device of the computing device, and so forth. The security measures may also include initiating remote reporting procedures to report computer-related information to the authorization server or some other entity. For example, a keystroke logging program might be initiated to report keystrokes made on the computing device. As another example, a camera associated with or built-in to the computing device may be used to capture and transmit a picture or a video of a person operating the computing device. Depending on the capabilities of the computing device, it may be possible also to report a location of the computing device, accounts accessed by the computing device, network addresses accessed by the computing device, and so forth. Such reporting may allow investigators to locate and recover the computing device, or to identify the parties who are using the computing device.

Access to credentials to access services may be centralized in a cloud computing environment (e.g., on an AAA server or a set of AAA servers) that is accessible using a network. Access to the credentials may be quickly and easily revoked, either automatically or based on user input, if a computing device used to access the credentials falls into the wrong hands.

FIG. 1 is a block diagram illustrating a system 100 for secure computer operations according to some implementations. The system 100 includes a client device 102 and a server 104 communicatively coupled to an AAA server 106 via a network 108. The AAA server 106 may provide a global AAA service, e.g., available to any device that is capable of accessing the Internet. The network 108 may include wired technologies (e.g., digital subscriber line (DSL), data over cable service interface specification (DOCSIS), Ethernet, etc.) and wireless technologies (global system for mobile (GSM), code division multiple access (CDMA), 802.11, Bluetooth®, etc.).

The client device 102 may include one or more processor(s) 110, one or more computer readable media 112, and firmware 114. The computer readable media 112 may include volatile storage (e.g., random-access memory) and/or non-volatile memory (e.g., a hard disk or another type of non-volatile memory). The computer readable media 112 may be used to store software instructions 116, such as device drivers, an operating system, software applications, that are executable by the processors 110 to perform various functions. The computer readable media 112 may include an agent 118. The firmware 114 may be stored in a type of read only memory (ROM), such as electrically erasable programmable ROM (EEPROM), flash memory, an integrated circuit, etc. The firmware 114 may include an identifier 120. The identifier 120 may be a unique identifier that identifies the client device 102 from among other devices. The identifier 102 may be embedded into the firmware 114 when the client device 102 is initially provisioned. The firmware 114 may include logic to that renders the client device 102 inoperable if an attempt to modify the identifier 120 is detected. For example, if the logic detects an attempt to modify the firmware 114, the logic may prevent the client device 102 from booting, erase the contents of a storage device associated with the client device 102, or perform another action to render the client device 102 inoperable. In some cases, the identifier 120 may be used as at least a portion of a key (e.g., credentials) when accessing a service. The firmware 114 refers to the firmware of the client device 102 and/or the firmware of a component of the client device 102. The components of the client device 102 may include a network interface component (NIC) to communicate with external devices using the network 108, the computer readable media 112, a basic input output system (BIOS) of the client device 102, etc. For client devices that have not been configured with the identifier 120 or the logic in the firmware 114, the agent 118 may perform the functions of the identifier 120 and/or the logic in the firmware 114. For example, the agent 118 may be configured to be tamper-proof (e.g., attempting to tamper with the agent 118 may cause the client device 102 to be rendered inoperable) and may sign at least some communications originating from the client device 102 by appending encrypted data that identifies the sender of the data as the client device 102. For example, the agent 118 may be implemented using a baseboard management controller (BMC) from an intelligent platform management interface (IPMI) architecture, or a similar or equivalent controller to the BMC. The BMC may comprise a specialized microcontroller embedded on a motherboard of a computer (e.g., the client device 102 and/or the server 104). The BMC may manage the interface between system management software and platform hardware for the client device 102 and/or the server 104. The agent 118 may execute on the BMC or similar controller card to enable the agent 118 to be relatively tamper-proof.

The server 104 may include one or more processor(s) 122, one or more computer readable media 124, and firmware 126. The computer readable media 124 may include volatile storage (e.g., random-access memory) and/or non-volatile memory (e.g., a hard disk or another type of non-volatile memory). The computer readable media 124 may be used to store software instructions 128, such as device drivers, an operating system, software applications, that are executable by the processors 122 to perform various functions, such as providing one or more services 130. For example, the services may include credit/debit card authorization services, fulfillment services, making sensitive information (e.g., addresses of clients) anonymous, a networking device inventory service, etc. The firmware 126 may include an identifier 132. The identifier 132 may be a unique identifier that identifies the server 104 from among other devices. The identifier 132 may be embedded into the firmware 126 when the server 104 is initially provisioned. The firmware 126 may include logic to prevent the identifier 132 from being modified or that renders the server 104 inoperable if the identifier 132 is modified. The firmware 126 may comprise the firmware of a component of the server 104 such as a NIC, the computer readable media 124, a basic input output system (BIOS) of the server 104, etc.

The AAA server 106 may include one or more processors 134 and one or more computer readable media 136. The computer readable media 136 may include instructions 138, a software library 140, logs 142, any number of N sets of credentials (N>0), including a first set of credentials 144 to an Nth set of credentials 146, and authorizations 148. The instructions 138 may be executable by the processors 134 to perform various functions provided by the AAA server 106, including authentication, authorization, and accounting. While the AAA server 106 is depicted as a single server in FIG. 1, the various functions of the AAA server may, in some implementations, be distributed among multiple hardware servers.

The software library 140 may be provided to a service provider when the service provider registers a service with the server 106 to enable the service provider to securely communicate with client devices that are accessing the service. The software library 140 may be used by client devices and/or service providers that use the services of the AAA server 106. The software library 140 may include modules that perform authentication and/or authorization tasks. For example, the software library 140 may perform functions such as retrieving a secure key from the AAA server 106, periodically synchronizing policy information with the AAA server 106, encrypting requests and signing the requests with a valid key, decrypting and authenticating responses, decrypting the requests, authenticating and authorizing the requests, updating the logs 142, etc. The software library 140 may be accessed using a set of application programming interfaces (API) that are included with the software library 140. Thus, the AAA server 106 may manage various aspects of relationships between client devices and services, such as maintaining information associated with client devices, services, and the relationships between client devices and services, providing functionality for creating and modifying information, generating updated security policies and providing the updated securities policies to client devices and service providers, generating keys for each service (e.g., a unique key for each application environment) and delivering the keys, and applying a set of rules that enable services to resolve security discrepancies and failures.

When a client device is communicating with a service, the AAA server 106 may monitor the communications and create the logs 142. For example, the logs 142 may include various statistics associated with the communication between the client device and the service, such as when the communication was initiated, how long the communication occurred, when the communication was terminated, an amount of traffic that occurred during the communication, other information associated with the communication, or any combination thereof.

One or more of the N sets of credentials 144 to 146 may be provided to a client device to enable the client device to communicate with a service, such as one of the services 130 provided by the server 104. Each of the set of credentials 144 to 146 may include "material", which refers to a smallest unit of a sensitive piece of data, such as an encryption key, a private key, a password, etc. Each material has an associated start-date and end-date (validity period), and a serial number (version) and belongs to a set of credentials. A set of credentials may have a globally-unique name (e.g., part of a reserved namespace) and a type (e.g. symmetric key, credential pair, certificate, etc.) and may include zero or more materials. Materials in a set may be identified by a serial number, which may be used as a version number. For example, a database password may be defined as:

MaterialSet
name: com.amazon.sp-team.mysql.password
type: CredentialPair
includes:
Material_1=serial: 1, data: "foo", type: "Credential"
Material_2=serial: 1, data: "user1", type: "Principal"
Material_3=serial: 2, data: "bar", type: "Credential"

In the above example, the materials in the set may include versions of a password as it changes over time. As another example, a key may be defined as:

MaterialSet
name: com.amazon.rsa.private.key
type: PrivateKey
includes:
MIIEoQIBAAKCAQEA2ded1OmD5uFJaxXzIqD+
5zVqonZqxVA4FHI . . .

The authorizations 148 may include information associated with which services have registered with the AAA server 106, which clients have been approved to access which services, and other authorization-related information. For example, when the client device 102 is authorized to access one of the services 130, the authorizations 148 may include information indicating that the client device is authorized to access one of the services 130.

To enable client devices to access one or more of the services 130, the server 104 may register one or more of the services 130 with the AAA server 106. For example, the server 104 may send a registration request 150 to the AAA server 106. The registration request 150 may include the unique identifier 132 embedded in the firmware 126 of the server 104. The identifier 132 may be a unique identifier that enables the AAA server 106 to determine whether the server 104 is a trusted device whose service may be registered. For example, in response to receiving the registration request 150, the AAA server 106 may look up the identifier 132 in a database to determine whether the server 104 is a trusted device. If the AAA server 106 determines that the server 104 is a trusted device, the AAA server 106 may register the service and send a registration response 152 indicating that the service has been registered at the AAA server 106. If the AAA server 106 determines that the server 104 is not a trusted device, the AAA server 106 may send the registration response 152 indicating that the request to register the service was denied.

If the AAA server 106 determines that the server 104 is a trusted device, the AAA server 106 may enable the server 104 to download the software library 140. For example, the registration response 152 may include the software library 140 or the registration response 152 may include information (e.g., a download link) to enable the server 104 to download the software library 154. The server 104 may install the software library 140 such that the software library 140 may be used when communicating with client devices that have registered to use one or more of the services 130.

The AAA server 106 may maintain a set of mappings 154 that map embedded identifiers (e.g., the identifier 132) of service providers with logical identities of the service providers and embedded identifiers (e.g., the identifier 120) of clients with logical identities of the clients. The logical identities of the service providers and the clients maintained in the mappings 154 may be used as an index to the authorizations 148 to identify one or more authorizations associated with a specific service provider or client. In some cases, a client fleet identifier 152 may be associated with a client fleet 154, where the client fleet 154 includes a set of one or more client devices, and a server fleet identifier 156 may be associated with a server fleet 158, where the server fleet 158 includes a set of one or more servers. From a client management perspective, the AAA server 106 may provide a client that is identified using a client fleet identifier (e.g., the client fleet identifier 152) with a pool of credentials (e.g., from the N credentials 144 to 146) for use by the client fleet 154. Thus, the pool of credentials may be mapped to a single client fleet identifier (e.g., the client fleet identifier 152) and the client fleet identifier may be provided access to different services by the AAA server 106. After a client identifier is permitted access to one or more services, the mappings 154 may be used to identify client devices (e.g., from the client fleet 154) associated with the client identifier when determining whether to permit or deny access to a service. The mappings 154 enable a client to add a client device to the client fleet 154 to access a service without having to separately request permission for that specific client device because the client device's permission is provided based on the client fleet identifier 152. Thus, permissions (e.g., credentials) may be based on a client identifier (e.g., the client fleet identifier 152) that is associated with multiple client devices (e.g., the client fleet 154), and the mappings 154 may map each of the multiple client devices to the client identifier. A particular service provider with an associated service provider identifier may have multiple servers (e.g., the server fleet 156), where each of the multiple servers is capable of providing the same (or equivalent) service. The mappings 154 may map the server devices from the server fleet 158 to the associated service fleet identifier 156. For example, a service provider may have ten servers in the server fleet 158 and then scale up to twenty servers to meet the demand for a particular service without the clients being aware because the clients access the particular service using the server fleet identifier 156 associated with the particular service. A client device may access a service using a service fleet identifier and the service may be provided by one of multiple servers from the fleet of servers associated with the service fleet identifier. Which particular server from the multiple servers provides the service may be transparent to the client device. The mappings 154 may thus map multiple servers to a service fleet identifier.

Thus, an authorization, authentication, and accounting server (e.g., the AAA server 106) may enable secure communications between client devices (e.g., the client device 102) and service providers (e.g., the server 104). The client devices and the service providers may include firmware in which a unique identifier (e.g., the identifiers 120 or 132) is embedded. In some cases, the unique identifier may comprise a private key.

To offer a service to client devices, the service provider may register the service with the AAA server 106. To register the service with the AAA server 106, the service provider (e.g., the server 104) may send a registration request to the server 106. The registration request may include the service provider's unique identifier to enable the AAA server 106 to determine whether the service provider is a trusted device. If the AAA server 106 determines that the service provider is a trusted device the AAA server 106 may register the service and enable the service provider to download and install a software library to enable the service provider to communicate securely with the client devices when providing the service.

Figure 2:
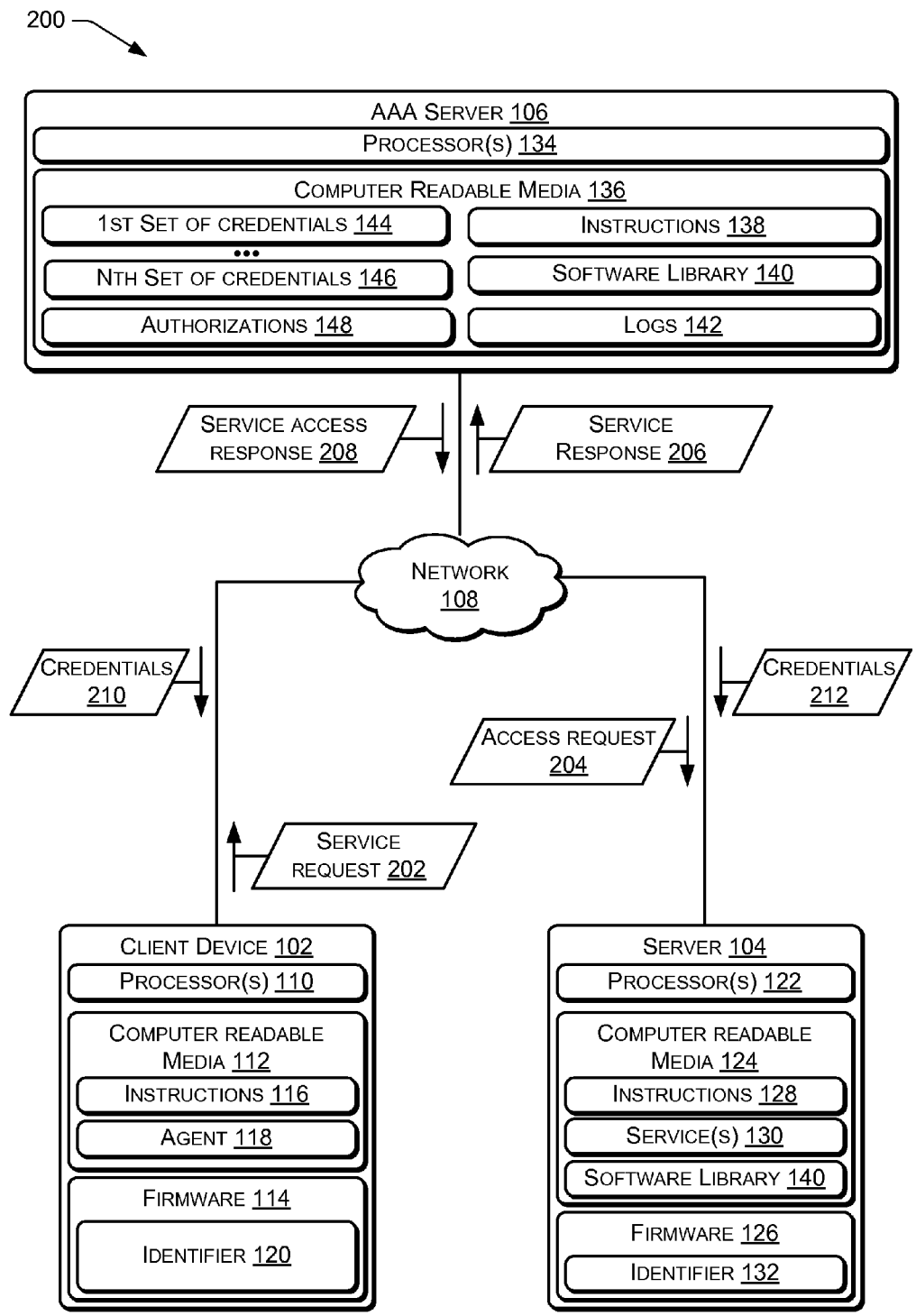
FIG. 2 is a block diagram illustrating a system that includes a client device sending a request to an AAA server to access a service according to some implementations.

FIG. 2 is a block diagram illustrating a system 200 that includes a client device sending a request to an AAA server to access a service according to some implementations. After the server 104 (e.g., the service provider) has registered one or more of the services 130 with the AAA server 106, the server 104 may advertise to one or more client devices that the services 130 are available.

The client device may request permission from the AAA server 106 to access one of the services 130. For example, the client device 102 may send a service request 202 to the AAA server 106 requesting access to a particular service (e.g., one of the services 130) being offered by the server 104. The service request 202 may include the identifier 120. For example, the identifier 120 may include a unique private key (or other type of credential). In response to receiving the service request 202, the AAA server 106 may validate a private key included in the identifier 120. In some cases, the AAA server 106 may determine a type and/or level of privileges of the client device 102 based on the identifier 120.

In some cases, in response to receiving the service request 202, the AAA server 106 may send an access request 204 to the server 104. The access request 204 may provide the server 104 with information as to which client device is requesting access to which service that the server 104 is providing. The server 104 may determine whether to approve or deny the service request 202 from the client device 102 and send a service response 206 to the server 106 indicating whether the service request 202 was approved or denied. For example, if the service request 202 includes the identifier 120 of the requesting client device, the server 104 may determine whether to approve or deny the service request 202 at least partly based on the identifier 120. Based on the service response 206, the server 106 may send a service access response 208 to the client device 102. The service access response 208 may indicate whether the service request 202 was approved or denied. If the service response 206 indicates that the server approved the service request 202, the AAA server 106 may distribute (e.g., send) credentials 210 to the client device 102 and credentials 212 to the server 104 to enable the client device 102 and the server 104 to securely communicate with each other. The client device 102 may store the credentials 210 on the computer readable media 112 and the server 104 may store the credentials 212 on the computer readable media 124. The AAA server 106 may select the credentials 210 and 212 from the N set of credentials 144 to 146. The credentials 210 and 212 may include public credentials, such as a public key. Thus, the credentials 210 may provide the client device 102 a public key of the server 104 and the credentials 212 may provide the server 104 a public key of the client device 102. The client device 102 may encrypt communications sent from the client device 102 using a private key (e.g., the identifier 120) and the server 104 may decrypt communications received from the client device 102 using the public key of the client device 102 provided by the credentials 212. The server 104 may encrypt communications sent to the client device 102 using a private key (e.g., the identifier 132) and the client device 102 may decrypt communications received from the server 104 using the public key of the server 104 provided by the credentials 210. When the AAA server 106 is available, the client device 102 may use the AAA server 106 to access a service offered by the service provider 104. However, if the AAA server 106 is unavailable, the client device 102 and the service provider 104 may communicate directly, using the credentials 210 and/or 212.

If the service response 206 indicates that the server 104 approved the service request 202, the AAA server 106 may note in the authorizations 148 that the client device 102 is approved to access one or more of the services 130. For example, the AAA server 106 may note (e.g., in the authorizations 148) that the client device 102 with the identifier 120 was approved to access one or more of the services 130. The AAA server 106 may send the service access response 208 indicating that the service request 202 was approved. The AAA server 106 may provide credentials, such as one of the N set of credentials 144 to 146, to both the client device 102 and the server 104. For example, the credentials may be provided in the service access response 208. The client device 102 may sign requests to connect to a service (e.g., one of the services 130) using the credentials. When the server 104 receives a connection request from a client device (e.g., the client device 102), the server 104 may compare the credentials provided by the client device with the credentials provided by the AAA server 106 to determine whether to permit the client device to connect to the service.

If the service response 206 indicates that the server 104 denied the service request 202, the AAA server 106 may note in the authorizations 148 that the client device 102 is not approved to access one or more of the services 130. For example, the AAA server 106 may note that the client device 102 with the identifier 120 is not approved to access one or more of the services 130. The AAA server 106 may send the service access response 208 indicating that the service request 202 was denied.

In some cases, the AAA server 106 rather than the server 104 may determine whether to allow or deny the service request 202 from the client device 102, e.g., the AAA server 106 may determine whether to allow or deny the service request 202 without sending the access request 204 to the server 104. For example, the AAA server 106 may determine whether to allow or deny the service request 202 from the client device 102 based on the identifier 120 of the client device 102. To illustrate, the client device 102 may have been blacklisted because the client device 102 had been reported as lost, stolen, or otherwise compromised. In such cases (e.g., the client device 102 is blacklisted), the AAA server 106 may automatically determine to deny the service request 202 without sending the access request 204 to the server 104. As another illustration, the client device 102 may send the service request 202 and the server 104 may send the service response 206 denying the request. The AAA server 106 may note the denial of the service request 202. At a subsequent point in time, the client device 102 may again send the service request 202. In such situations, the AAA server 106 may determine that the server 104 had previously denied the service request 202 from the client device 102 and send the service access response 208 denying the service request 202 without sending the access request 204 to the server 104. Of course, there may be other situations in which the AAA server 106 sends the service access response 208 (e.g., either allowing or denying the service request 202), e.g., without sending the access request 204 to the server 104 and without receiving the service response 206 from the server 104.

Thus, a client device, such as the client device 102, may send a request to the AAA server 106 requesting permission to access one or more of the services 130 provided by the server 104 (e.g., the service provider). The request may include a unique identifier that is embedded in a firmware of the client device. In some cases, the AAA server 106 may determine whether to allow or deny the request while in other cases the AAA server 106 may provide information associated with the request (e.g., an identity of the client device, which service is being requested, why the service is being requested, etc.) to the server 104, and the server 104 may determine whether to allow or deny the request. If the request is allowed (e.g., granted), then the AAA server 106 may note (e.g., in the authorizations 148) that the client device 102 is authorized to access the services 130. If the request is denied, then the AAA server 106 may note (e.g., in the authorizations 148) that the client device 102 is not authorized to access the services 130.

Figure 3:
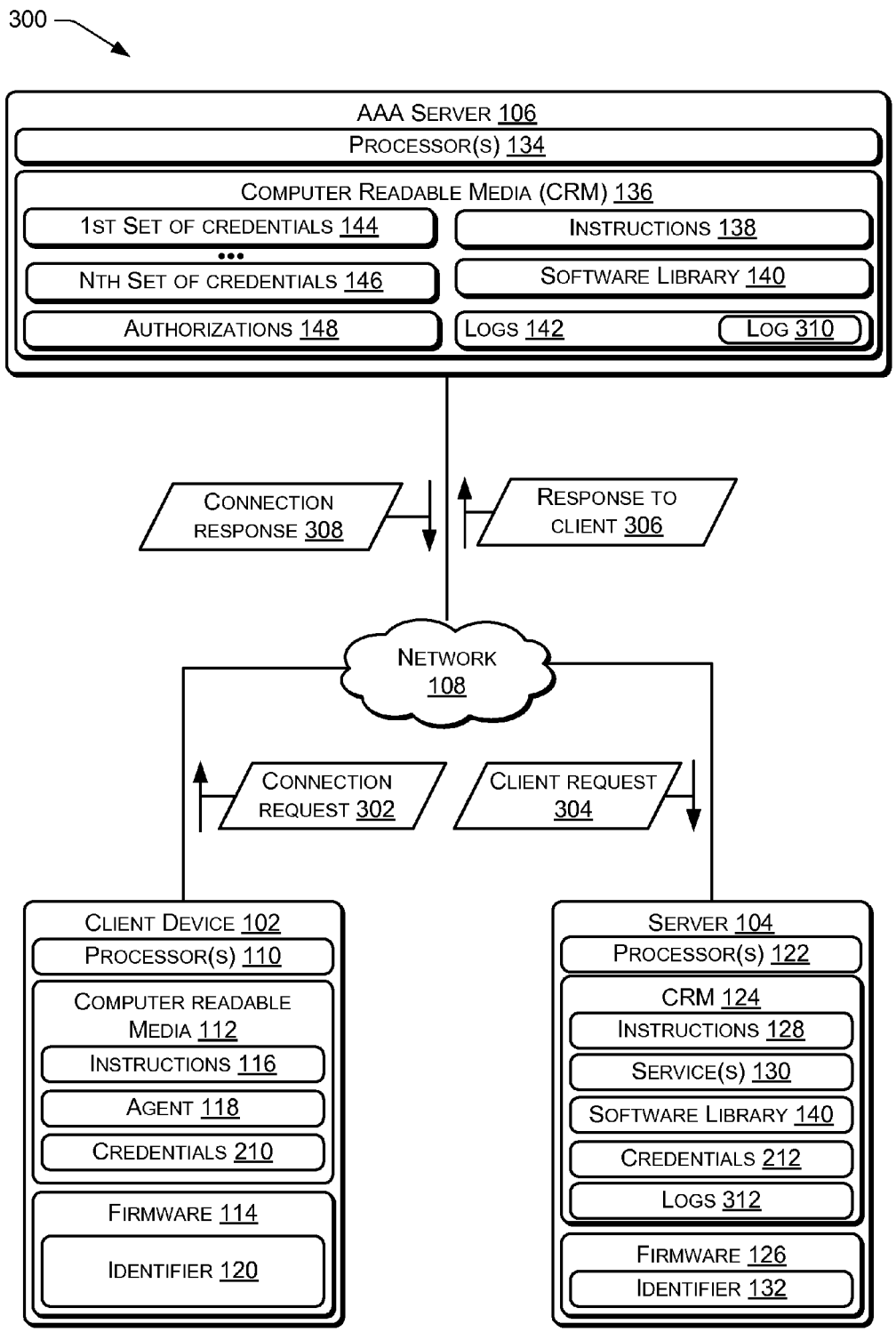
FIG. 3 is a block diagram illustrating a system that includes a client device sending a request to an AAA server to connect to a service according to some implementations.

FIG. 3 is a block diagram illustrating a system 300 that includes a client device sending a request to an AAA server to connect to a service according to some implementations. After the server 104 has registered one or more of the services 130 with the server 106 and after the client device 102 has received permission to access one or more of the services 130, the client device 102 may send a connection request 302 requesting to connect to (e.g., to use) one or more of the services 130. For example, in some cases, after the server 104 has registered the services 130 and after the client device 102 has received permission to access the services 130, the client device 102 may send the connection request 302 each time the client device 102 connects to the server 104 to use one or more of the services 130. To illustrate, the client device 102 may send the connection request 302, connect to the server 104 to use the services 130 and, after the client device 102 has completed using the services 130, terminate the connection. At a later point in time, the client device 102 may again send the connection request 302, connect to the server 104 again to use the services 130 and, after the client device 102 has completed using the services 130, terminate the connection again, and so on. Thus, after the server 104 has registered the services 130 and after the client device 102 has received permission to access the services 130, the client device 102 may send a connection request 302 as needed (e.g., on demand) to use the services 130. At least a portion of the connection request 302 may be encrypted using a private key (e.g., the identifier 120) and the server 104 may decrypt the connection request 302 using the public key of the client device 102 provided by the credentials 212. The firmware 114 and the firmware 126 may be part of a network interface controller (NIC) of their respective devices and may automatically encrypt at least some portions of some communications originating from their respective devices. For example, the firmware 114 may encrypt data in at least some communications using the private key (e.g., the identifier 120) of the client device 102 and the firmware 126 may encrypt data in at least some communications using the private key (e.g., the identifier 132) of the server 104. The firmware 114 may automatically sign (e.g., using a digital signature) at least some communications, such as the connection request 302, using a private key (e.g., the identifier 120). Other components (e.g., device drivers, operating systems, applications, or the like) of the client device 102 may be unaware that the firmware 114 is signing communications sent by the client device 102. The firmware 126 may automatically sign at least some communications using a private key (e.g., the identifier 132). Thus, both the firmware 114 and the firmware 126 may be part of a NIC of their respective devices and may automatically sign and/or encrypt at least some of the communications sent from the client device 102 and the server 104, respectively. The firmware 114 and the firmware 126 may automatically perform actions, such as signing and/or encrypting communications, without other components of the client device 102 and the server 104 being aware of the actions being performed. A software component of the client device 102, such as an operating system, may authenticate and/or decrypt communications received from the server 104 using a public key of the server 104 (e.g., the public key provided in the credentials 210). A software component of the server 104, such as an operating system, may authenticate and/or decrypt communications received from the client device 102 using a public key of the client device 102 (e.g., the public key provided in the credentials 212). In some implementations, a network device may be placed in-between the client device 102 (and/or the server 104) and the network 108 and the network device may automatically add a digital signature to at least some of the communications sent by the client device 102 (and/or the server 104). For example, legacy client devices and/or legacy servers that include network interface controllers that are not capable of storing credentials or adding signatures may use a network device to store credentials and add digital signatures to communications.

In some implementations, in response to receiving the connection request 302, the AAA server 106 may send a client request 304 to the server 104. The client request 304 may indicate that the client device 102 is requesting to connect to one or more of the services 130. The server 104 may send a response to client 306 to the AAA server 106. The response to client 306 may indicate whether the server 104 is able to accommodate the connection request 302. The AAA server 106 may send a connection response 308 to the client device 102 based on the response to client 306 indicating whether or not the server 104 has granted permission for the client device 102 to connect to one or more of the services 130. For example, in response to receiving the client request 304, the server 104 may determine that the client device 102 may connect to one or more of the services 130 and may send information in the response to client 306 to enable the client device 102 to connect to one or more of the services 130. For example, the information may include a location (e.g., a port number, an internet protocol address, a uniform resource locator, or the like) to access the services 130, a credential (e.g., a private key or a public key), or other information that enables a client device 102 to connect to one or more of the services 130. The AAA server 106 may send the information to the client device 102 in the connection response 308.

In other implementations, the AAA server 106 may provide the connection response 308 without sending the client requests 304 to the server 104. For example, the AAA server 106 may have noted in the authorizations 148 that the client device 102 as permission to connect to the server 104. In this example, the AAA server 106 may determine that the client device 102 is authorized to connect to the one or more services 130 and send the connection response 308 to the client device 102. The connection response 308 may include the information to enable a client device 102 to connect to one or more of the services 130.

As mentioned above in FIG. 2, when the service request 202 is approved, the AAA server 106 may provide credentials, such as one of the N set of credentials 144 to 146, to both the client device 102 and the server 104. The client device 102 may sign requests to connect to a service, such as the connection request 302, using the credentials. When the server 104 receives the client request 304, the server 104 may compare the credentials provided by the client device 102 with the credentials provided by the AAA server 106 to determine whether to permit or deny the connection request 302.

Each time the client device 102 sends the connection request 302, the AAA server 106 may generate a log 310 (e.g., "client device XYZ requested a connection to service ABC at <time><date>") and store the log 310 in the logs 142. Each time the server 104 receives a request from a client (e.g., the client request 304), the server 104 may generate an entry to logs 312 stored in the computer readable media 124. The AAA server 106 may request logs, such as the logs 312, from the server 104 and compare the logs 312 from the server 104 with the logs 142. For example, the AAA server 106 may compare the log 310 with the logs 312 to determine whether the client device 102 is abusing one or more of the services 130 provided by the server 104. For example, comparing the log 310 with the logs 312 may indicate that the client device 102 connected to one of the services 130 directly, bypassing the AAA server 106. In response to detecting inappropriate use of the services 130 based on analyzing logs (e.g., the logs 310 and 312), the AAA server 106 may revoke one or more of the credentials (e.g., the credentials 210) provided to a client device, such as the client device 102.

Because connections between client devices and services are established via the AAA server 106, the server 106 may monitor and analyze the connections to generate the logs 142. The logs 142 may include information associated with the usage of services by client devices, such as which client devices use which services, how much of each service is used by each client device, a length of each connection between a client device and a service, an amount of bandwidth used by each connection between a client device and a service, etc. The logs 142 may be used to modify services, such as changing which services are offered, changing which clients are permitted to access which services, and other modifications to improve service utilization. For example, the AAA server 106 may collect and analyze the logs 142 to determine information such as why a client device is connecting to a service, whether the client device is using the service correctly and efficiently, how the client device may be contacted, whether the client device is accessing sensitive (e.g., critical or confidential) data, what tier of service a client device belongs to, whether access to a service can be throttled to a client device in emergency situations, whether a client device's access to a service may be removed if they no longer access the service, a history of a relationship between a client device and a service and how the relationship has changed over time, etc.

The AAA security model described herein is based on a relationship between a client device and a service. Service providers register services with the AAA server 106. To access a service that is registered with the AAA server 106, client devices request permission to access the service. In some cases, client access requests may be granted or denied by the service provider. For example, if the service provider approves the request to permit access to the service, a relationship is established between the client device and the service provider. The AAA server 106 keeps a record of the client-service relationship, tracks changes to the relationship over time, and deploys credentials (e.g., set of credentials). Once a relationship is established, AAA adds authentication data to each of the logs 142, including client device identifiers, service provider identifiers, and a success or failure of authentication and/or authorization.

The AAA server 106 may develop a policy for each of the services that are registered with the AAA server 106. For each service, the policy may include a whitelist of clients authorized to make requests and a scope of the requests (e.g., which actions a client device can perform with a particular service). The policies may be maintained by the AAA server 106 in the authorizations 148. The AAA server 106 may provide the policies to client devices and to service providers on a regular basis (e.g., at regular intervals and/or in response to specific events). When a client device accesses a service, the policies of the client device may be compared with the policies of the service. If the policies match, the service may respond to the client device. If the policies do not match, the AAA server 106 may follow rules provided by the service owner to determine whether to allow or block the request from the client device to access the service.

The AAA server 106 may thus act as a secure intermediary between service providers, such as the server 104, and client devices, such as the client device 102. The AAA server 106 maintains the credentials (e.g., keys, set of credentials, or the like) rather than the service providers or the client devices. For example, if the connection request 302 is approved, the AAA server 106 may provide the Nth set of credentials 146 to both the client device 102 and the server 104. The client device 102 may sign the connection request 302 (e.g., requesting a connection to the services 130) with the Nth set of credentials 146. When the server 104 receives the client request 304, the client request 304 may include the Nth set of credentials 146. The server 104 may validate the client request 304 based on the Nth set of credentials 146.

In contrast to conventional authorization schemes that focus solely on granting access to a resource, the AAA server 106 enables client devices and service providers to establish and maintain an ongoing relationship. This relationship encompasses several goals, including verifying an identity of the client device (Authentication), providing the client permission for a limited scope of actions (Authorization), and monitoring and analyzing ongoing communication between client devices and services (Accounting). The AAA server 106 may be used whenever sensitive data is involved. One advantage of using the AAA server 106 is that the AAA server 106 handles whitelisting and blacklisting tasks such that service owners may no longer maintain an individual client list and perform additional tasks when adding a new client. The AAA server 106 is designed to handle the dirty work of maintaining relationships, from creating and maintaining client whitelists to managing permissions on a fine-grained level. The AAA server 106 may block intrusions and protect from inadvertent leaks and provide the logs 142 to enable resource (e.g., services) allocation and efficient usage of resources because the AAA server 106 tracks detailed information about client devices and services and monitors client-service relationships over time.

Thus, after a service provider has registered a service and after a client device has received permission to access the service, the client device may request to connect to the service as needed. Either the AAA server 106 or the server 104 may determine whether to grant the connection request. If the connection request is granted, the response to the connection request may include information, such as a location (e.g., a port number, an internet protocol address, a uniform resource locator, or the like), credentials, or other information that enables the client device to connect to the service.

Figure 4:
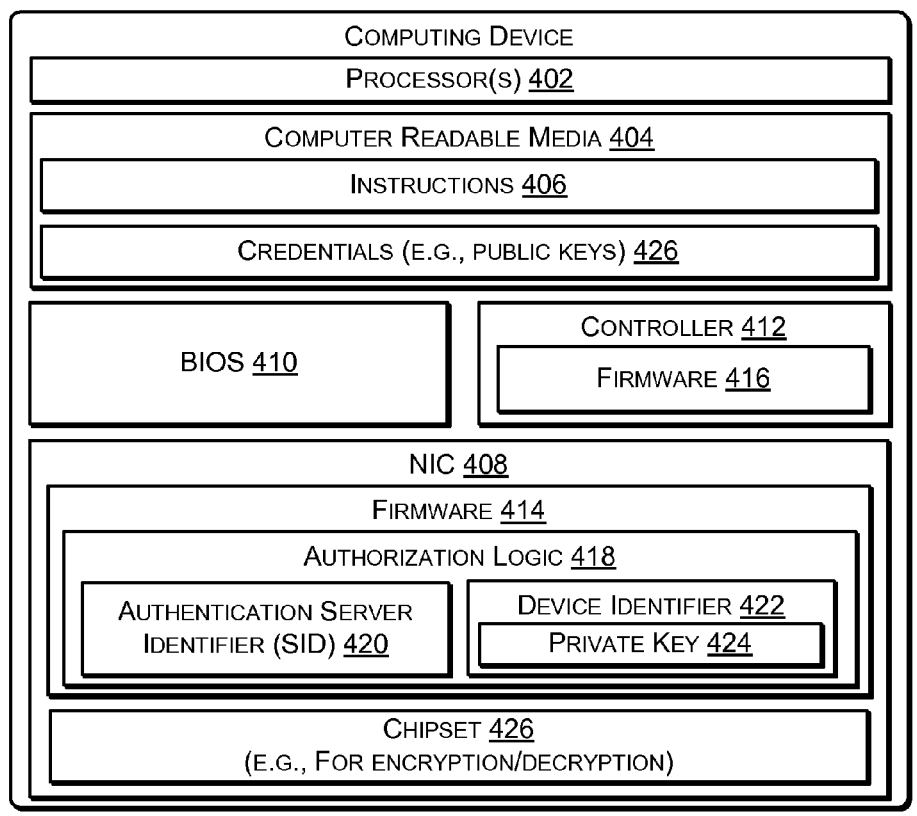
FIG. 4 is a block diagram illustrating a computing device to implement a client device or a server according to some implementations.

FIG. 4 is a block diagram illustrating a computing device 400 to implement a client device or a server according to some implementations. For example, the computing device 400 may be used to implement the client device 102, the server 104, the server 106, or any combination thereof.

The computing device 400 may include one or more processors 402, one or more computer readable media 404, a network interface card (NIC) 408, a basic input output system (BIOS) 410, and a controller 412. The computer readable media 404 may include various types of memory including volatile (e.g., disk-based) storage devices and non-volatile (e.g., random access memory (RAM)) storage devices. The computer readable media 404 may include one or more instructions 406 that are executable by the processors 402 to perform various functions. The NIC 408 may enable the computing device 400 to communicate with other computing devices using a network, such as the network 108 of FIG. 1, 2 or 3. The NIC 408 may include firmware 414 that includes instructions to enable the NIC 408 to perform various communication functions. The controller 412 may be used to control a storage device, such as a hard disk or solid-state drive. The controller 412 may include firmware 416 that includes instructions to enable the controller 412 to perform various storage related functions, such as writing data to a storage device and reading the data from the storage device. The BIOS 410, the firmware 414, the firmware 416, or any combination thereof may be stored in a read only memory (ROM), such as electrically erasable programmable ROM (EEPROM). The EEPROM may enable authorization logic 128 to be embedded into the client device 102 when the computing device is initially provisioned.

The system BIOS 410 may comprise non-volatile memory including instructions that the processors 402 execute upon startup. The instructions in the BIOS 410 may initialize various subsystems, such as networking systems, storage systems, and so forth. The BIOS 410 may also contain instructions and functionality that are used during normal, non-startup operations of the computing device 410.

Various computer peripherals may also have firmware. Note that such firmware may include instructions that are executed for normal operations of the peripherals, as well as boot firmware that is executed upon startup of the peripherals. For example, the firmware 414 may be executed upon startup of the computing device 400, to initialize the NIC 408. Likewise, the firmware 416 may be executable to initialize storage capabilities of the computing device 400. The instructions stored by the firmware 414 and/or 416 may be executed upon startup by the processor(s) 402 or by processors associated with the NIC 408 and controller 412. Certain portions of the firmware of the various computer peripherals may also be invoked during normal, post-startup operations of the computing device 400.

One or more of the subcomponents of the computing device 400 may be configured as boot devices or components. Thus, the system BIOS 410 may be configured to perform low level initializations, and to then look to a peripheral device or subcomponent for higher level instructions. A boot device may contain or provide access to operating software for a computer, such as an operating system. A boot device may also contain or provide access to instructions for provisioning a computer.

The computing device 400 may be configured through its BIOS 410 to initially use the computer readable media 404 as a boot device. The NIC 408 may be configured by way of its firmware 414 to contact an authorization server (e.g., the AAA server 106 of FIGS. 1, 2, and 3) through the network 106 for authorization, credentials, provisioning information, software, other data, or any combination thereof. The authorization server may be maintained by a business entity to automatically provision its own computers, or may be maintained by a service provider for use by multiple customers of the service provider.

The authorization server may be identified and accessed by a specific network address. In the Internet environment, the authorization server may be identified by a unique IP address or Universal Resource Locator (URL). Other forms of global identification may also be used to uniquely identify the provisioning service among different network entities that are accessible through the network 106.

The authorization logic 128 may be embedded within firmware, such as in one or more of the BIOS 410, the firmware 414 of the NIC 408, the firmware 416 of the controller 412, the firmware of other components associated with the computing device 400, or any combination thereof. As illustrated in FIG. 4, authorization logic 418 may embedded in the firmware 414 and may be configured to be executed upon computer startup. In addition, the authorization logic 418 may configured to repeatedly contact the authorization server to obtain authorization for continuing operations of the computing device 400, and to at least partially disable the computing device 400 upon failure to obtain such authorization. In some implementations, the authorization logic 418 may be implemented using a field programmable gate array (FPGA) or similar technology.

In some embodiments, the authorization logic 418 may include an authentication server identifier (SID) 420 identifying an authorization server (e.g., the AAA server 106) from which the computing device 400 is to obtain credentials. The authentication server identifier 130 may be an IP address, a URL, or some other type of location identifier allowing the computing device 400 to identify and access the authorization server via a network.

The authorization logic 418 may include a device identifier 422. The device identifier 422 may enable the computing device 400 to verify the identity of the authorization server, and may enable the authorization server to authenticate the computing device 400. Using the device identifier 422, the computing device 400 may determine whether it is communicating with the intended authorization server. Similarly, the authorization server may whether it is communicating with authorized devices. The device identifier 422 may also enable the authorization server to reliably identify the computing device 400, and to provide customized provisioning information and software for different computing devices. For example, the device identifier 422 may uniquely identify the client device 102 from among other computing devices. The authorization server may be able to quickly and easily identify a particular computing device from multiple computing devices based on the unique identifier included in the authentication information 132. The device identifier 422 may include a key (e.g., credentials) or may be include as part of a key.

In some implementations, the NIC 408 may include a chipset 426 that is capable of performing encryption and/or decryption functions while in other implementations, the firmware 414 may include instructions for performing encryption and/or decryption functions. Locating the encryption and/or decryption functions at a low level of the NIC 408 may enable relatively fast, tamper-resistant operations.

The authorization logic 418 may be configured in such a way that it is tamper-proof, tamper-resistant, and/or tamper-evident, so that it is impractical for someone in possession of the computer to alter the computer hardware. Furthermore, the authorization logic 418 may be physically integrated with the encryption/decryption capabilities of a storage device, so that it becomes impractical to bypass the security-related functionality described above without destroying or breaking the encryption/decryption capabilities of the storage device.

The device identifier 422 may include private credentials, such as a private key 424. The computer readable media 404 may be used to store public credentials 426, such as public keys, that are received from the AAA server 106. The authorization logic 418 may sign at least some communications sent from the computing device 400 using the private key 424. For example, the authorization logic 418 may append (or prepend) encrypted data identifying that the communications were sent by the computing device 400. When the computing device 400 receives a communication that includes encrypted data, a software component of the computing device 400, such as an operating system, may decrypt (e.g., authenticate) the communication using the credentials 426. The private key 424 may be accessible to the authorization logic 418 but not to other components (e.g., an operating system or software applications) of the computing device 400.

Thus, the computing device 400 may be used to various devices discussed herein, such as the client device 102 or the server 104 of FIG. 1, 2, or 3. For example, the components 402, 404, 406, and 422 of the computing device 400 may correspond to the components 110, 112, 116, and 120 of the client device 102 and/or the components 122, 124, 128, and 132 of the server 104. Similarly, the firmware 114 of the client device 102 and/or the firmware 126 of the server 104 may include one or more of the firmware 414, the firmware 416, or the BIOS 410.

In the flow diagrams of FIGS. 5-8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, 700, and 800 are described with reference to the architectures 100, 200, 300, and 400 as described above, although other models, frameworks, systems and environments may implement these processes.

Figure 5:
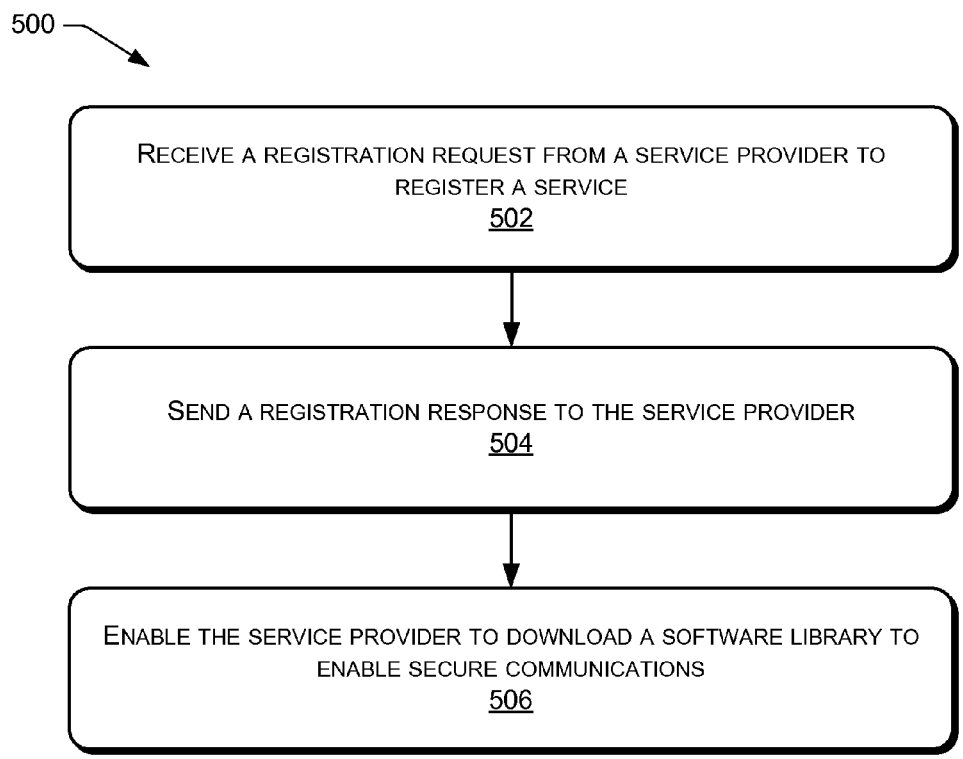
FIG. 5 is a flow diagram of an example process that includes receiving a request to register a service according to some implementations.

FIG. 5 is a flow diagram of an example process 500 that includes receiving a request to register a service according to some implementations. The process 500 may be performed by the AAA server 106 of FIG. 1, 2 or 3.

At 502, a registration request to register a service may be received from a service provider. For example, in FIG. 1, the AAA server 106 may receive the registration request 150 from the server 140 (e.g., the service provider) to register one or more of the services 130. The registration request 150 may include the identifier 132 that is embedded in the firmware 126. In some cases, the identifier 132 may comprise a private key.

At 504, a registration response is sent to the service provider. For example, in FIG. 1, in response to receiving the registration request 150, the AAA server 106 may determine whether the server 104 (e.g., the service provider) is a trusted device based on the identifier 132. If the AAA server 106 determines that the server 104 is a trusted device, the AAA server 106 may register one or more of the services 130 and send the registration response 152 to indicate that one or more of the services 130 was registered. If the AAA server 106 determines that the server 104 is not a trusted device (e.g., the identifier 132 is unrecognized or the identifier 132 is associated with a device that was reported lost or stolen), the AAA server 106 may send the registration response 152 indicating that the registration request 152 was denied and none of the services 130 were registered.

At 506, the service provider may be enabled to download a software library to enable secure communications. For example, in FIG. 1, the AAA server 106 may include information (e.g., a download link) in the registration response 152 to enable the sever 104 (e.g., the service provider) to download and install the software library 140. The software library 140 may enable the services 130 to be securely provided to client devices.

Thus, a service provider may send a request to an AAA server to register a service. The request may include a device identifier associated with a computing device (e.g., server) that hosts the service. The AAA server may determine whether the server is a trusted device based on the device identifier. If the AAA server determines that the server is a trusted device, the AAA server may register the service. In addition, the AAA service may enable the service provider to download a software library that includes modules to securely communicate with client devices. If the AAA server determines that the server is not a trusted device, the AAA server may not register the service and may take protective actions, such as blacklisting the service provider.

Figure 6:
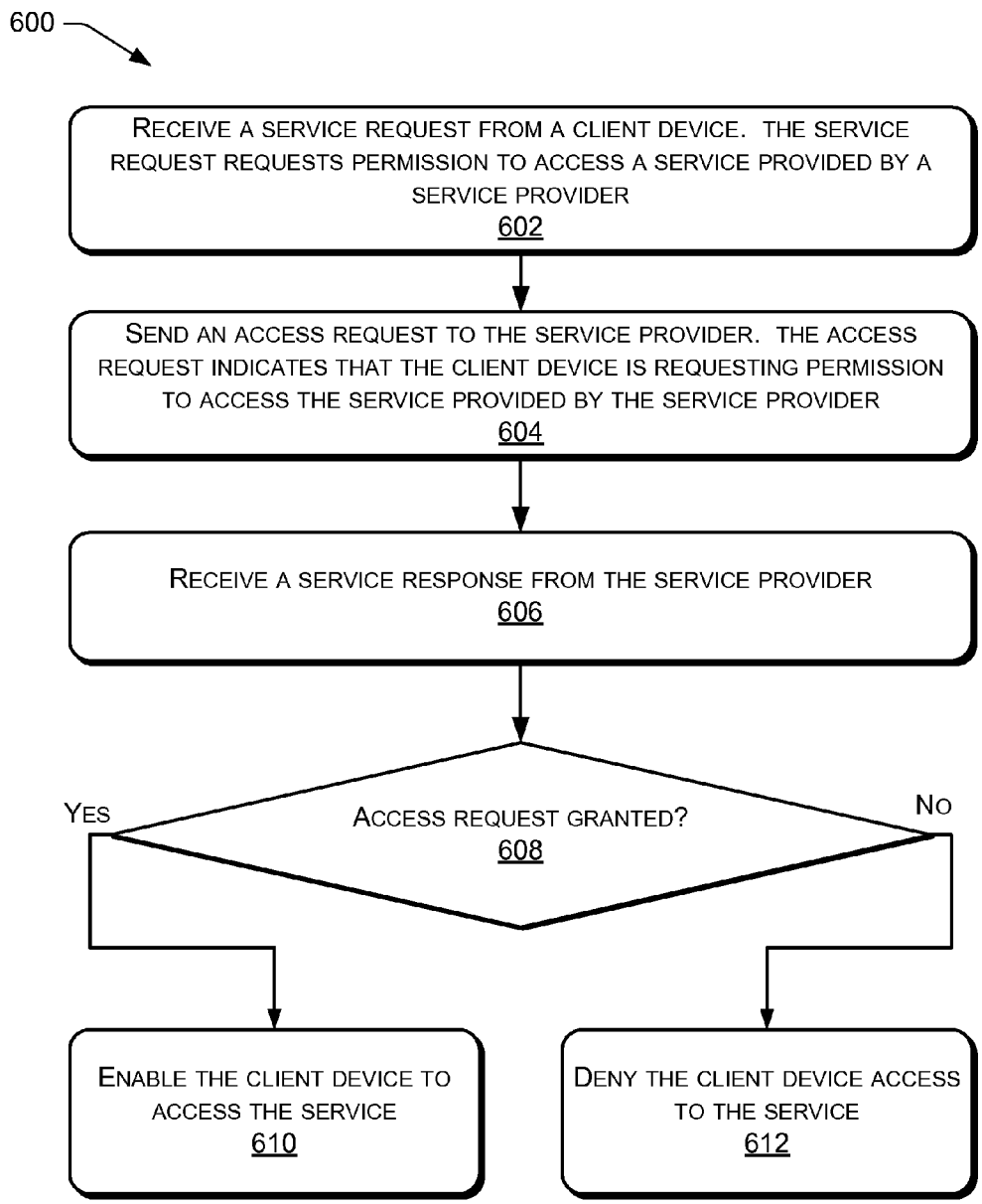
FIG. 6 is a flow diagram of an example process that includes receiving a request to access a service according to some implementations.

FIG. 6 is a flow diagram of an example process 600 that includes receiving a request to access a service according to some implementations. The process 600 may be performed by the AAA server 106 of FIG. 1, 2 or 3.

At 602, a service request may be received from a client device. The service request may request permission to access a service provided by a service provider. For example, in FIG. 2, the client device 202 may send the service request 202 requesting permission to access one or more of the services 130.

At 604, an access request may be sent to the service provider. The access request may indicate that the client device is requesting permission to access the service provided by the service provider. For example, in FIG. 2, in response to receiving the service request 202, the AAA server 106 may send the access request 204 to the server 104. The access request 204 may include information associated with the service request 202, such as the identifier 120 of the requesting device (e.g., the client device 102), which of the services 130 are being requested, reason(s) why the requesting device is requesting access, and/or other information associated with the service request 202.

At 606 a service response is received from the service provider. For example, in FIG. 2, in response to receiving the access request 204, the server 104 may determine whether to allow or deny the request from the client device 102 to access one or more of the services 130 and send the service response 206 to the AAA server 106.

At 608, a determination may be made whether the access request was granted. If a determination is made that the access request is granted, at 608, then the client device may be enabled to access the service, at 610. If a determination is made that the access request is not granted, at 608, then the client device may be denied access to the service, at 612. For example, in FIG. 2, the AAA server 106 may determine, based on the service response 206, whether or not to grant the client device 102 access to one or more of the services 130. If the service response 206 indicates that the service request 202 was approved by the service provider (e.g., the server 204), the AAA server 106 may note in the authorizations 148 that the client device 102 is authorized to access one or more of the services 130 and send the service access response 208 indicating that the client device 102 has permission to access one or more of the services 130. If the service response 206 indicates that the service request 202 was denied by the service provider, the AAA server 106 may note in the authorizations 148 that the client device 102 is not authorized to access one or more of the services 130 and send the service access response 208 indicating that permission to access one or more of the services 130 was denied.

In some cases, 604 and 606 may not be performed. For example, the AAA server 106 may determine, based on the service request 202, whether to grant the client device 102 permission to access the services 130. For example, the AAA server 106 may determine, based on the identifier 120 included in the service request 202, that the client device 102 was reported lost or stolen and deny the service request 202 without sending the access request 204.

Thus, when a client device requests permission to access a service, in some cases the AAA server may ask the service provider to determine whether to enable the client device to access one or more service provided by the service provider. In other cases the AAA server may determine whether to enable the client device to access one or more service provided by the service provider.

Figure 7:
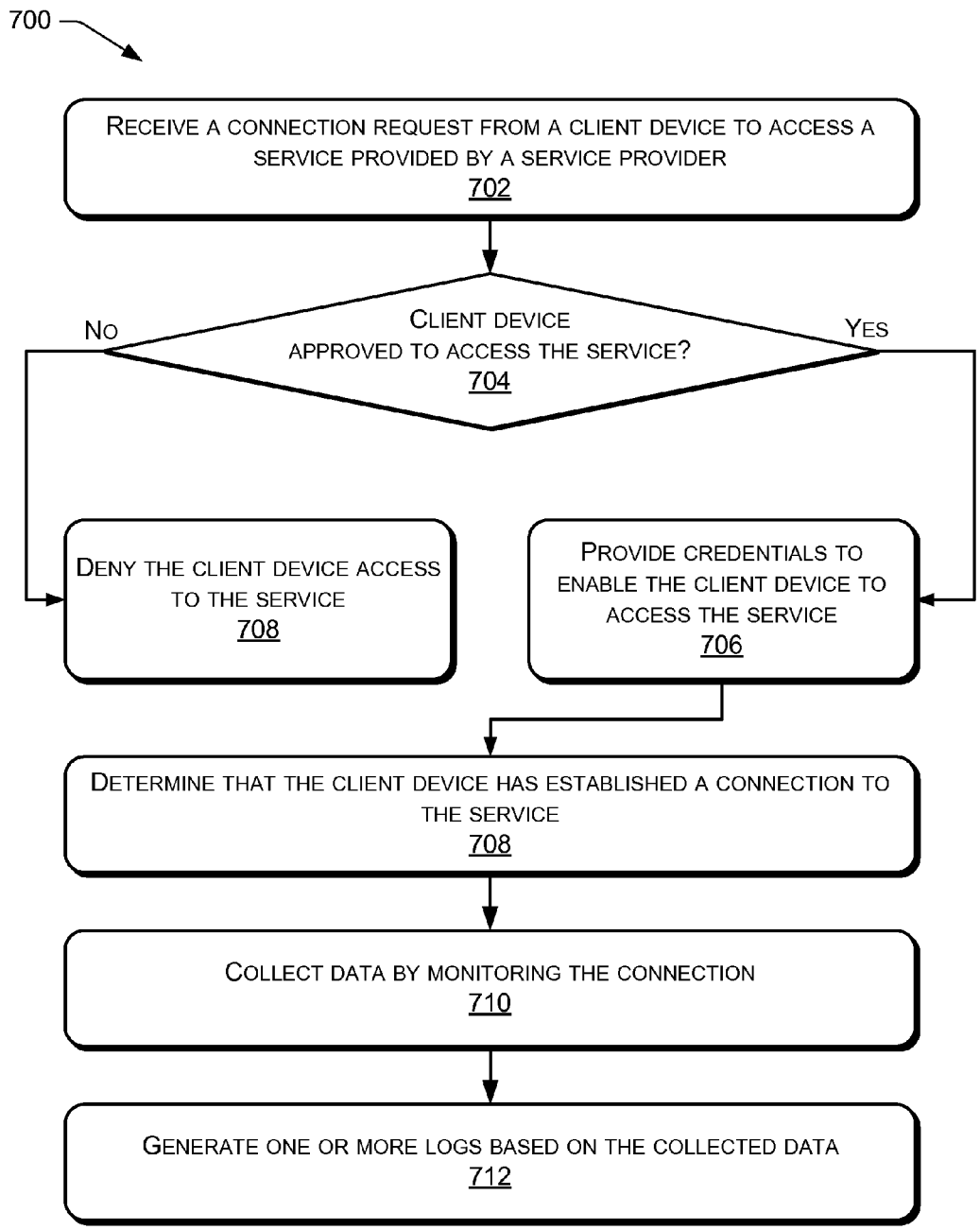
FIG. 7 is a flow diagram of an example process that includes receiving a request to connect to a service according to some implementations.

FIG. 7 is a flow diagram of an example process 700 that includes receiving a request to connect to a service according to some implementations. The process 700 may be performed by the AAA server 106 of FIG. 1, 2 or 3.

At 702, a connection request may be received from a client device to access a service provided by a service provider. At 704, a determination may be made whether to approve access to the service. If a determination is made to approve access to the service, at 704, then credentials to enable the client device to access the service may be provided, at 706. If a determination is made to deny access to the service, at 704, then the client device may be denied access to the service, at 708.

For example, in FIG. 3, the AAA server 106 may receive the connection request 302 from the client device 302. The connection request 302 may request permission to connect to one or more of the services 130 that the client device 102 was previously approved to access. In response to the connection request 302, the AAA server 106 may grant or deny the connection request 302 or the AA server 106 may send the client request 304 to the server 104 to enable the server 104 to grant or deny the connection request 302. If the connection request 302 is approved (e.g., either by the AAA server 106 or by the server 104), then the connection response 208 may indicate that the connection request 302 was approved and include information to enable the client device 102 to connect to one or more of the services 130. For example, the information in the connection response 308 may include credentials (e.g., a public key or a private key), a location (e.g., a port number), or other information that enables the client device 102 to connect to and use the services 130.

After providing the credentials to enable the client device to access the service, at 706, a determination may be made that the client device has established a connection to the service, at 708. At 710, data may be collected by monitoring the connection (e.g., between the client device and the service). At 712, one or more logs may be generated based on the collected data.

For example, in FIG. 3, after sending the connection response 308 to the client device 102, the AAA server 106 may determine that the client device 102 has established a connection to one of the services 130. The AAA server 106 may monitor the connection and collect data associated with the connection, such as how long the client device 102 was connected, how much data was exchanged, what type of transactions occurred, etc. The AAA server 106 may generate one or more of the logs 142 based on the collected data. For example, the AAA server 106 may analyze the collected data and determine that the client device 102 is using the service more than other client devices and generate a log indicating that the client device 102 is using the service more than other client devices.

Figure 8:
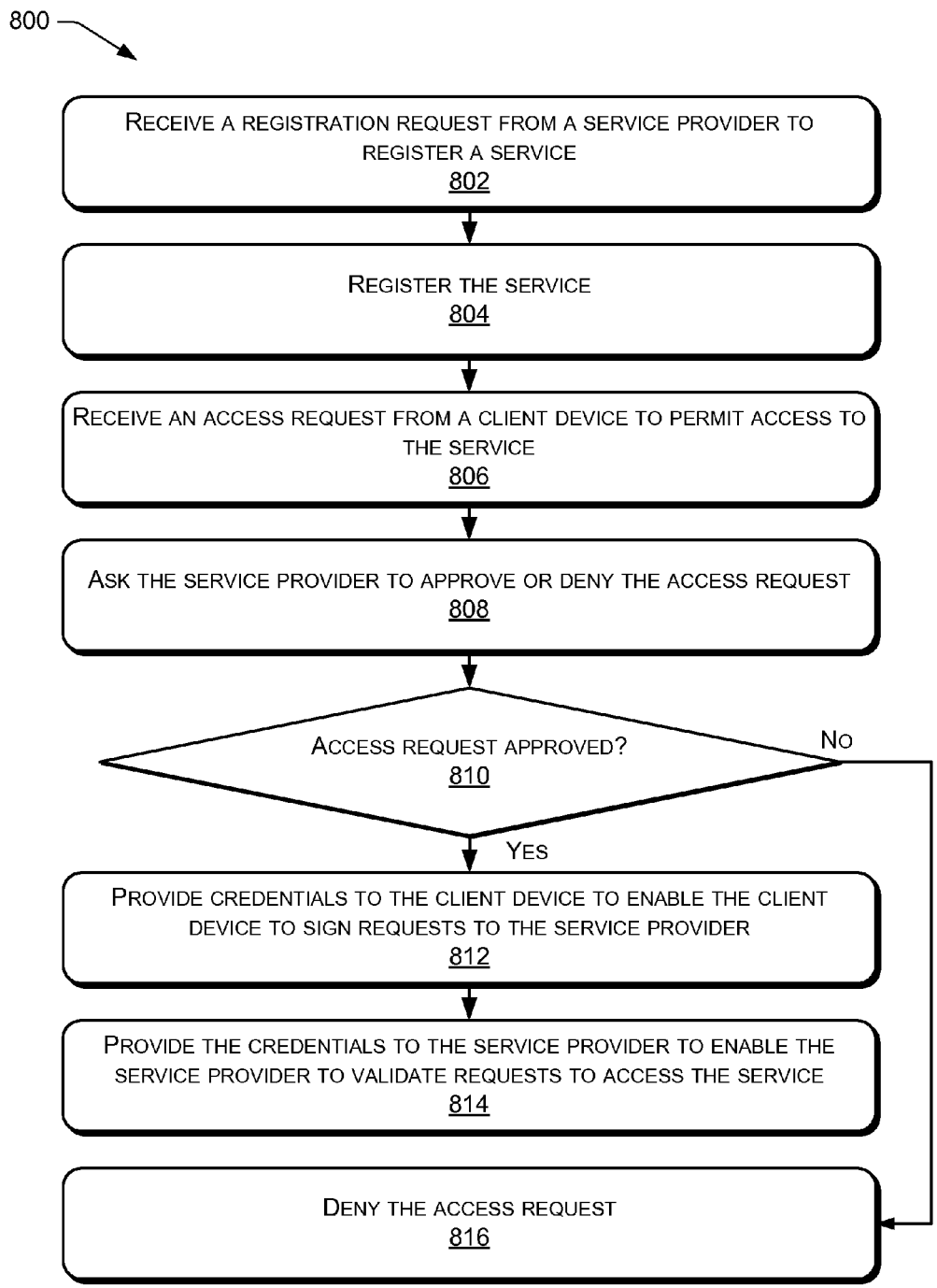
FIG. 8 is a flow diagram of an example process that includes registering a service according to some implementations.

FIG. 8 is a flow diagram of an example process 800 that includes registering a service according to some implementations. The process 800 may be performed by the AAA server 106 of FIG. 1, 2 or 3.

At 802, a registration request may be received from a service provider to register a service. At 804, the service may be registered. For example, in FIG. 1, the AAA server 106 may receive the registration request 150 from a service provider (e.g., the server 104) to register one or more of the services 130 that are hosted by the server 104. The AAA server 106 may determine whether or not to register the services 130 based at least partly on an identity of the service provider (e.g., based on the identifier 132). If the AAA server 106 determines that the service provider is a trusted service provider, the AAA server 106 may register one or more of the services 130.

At 806, an access request from a client device may be received. The access request may request permission to access the service. At 808, the service provider may be asked to approve or deny the access request. At 810, a determination may be made whether the access request was approved. For example, in FIG. 2, the client device may send the service request 202 to the AAA server 106 requesting permission to access one or more of the services 130. In response, the AAA server 106 may send the access request 204 to the server 104. The access request 204 may provide information associated with the service request 202, such as an identity (e.g., the identifier 120) of the client device 102, why the client device 102 is requesting access, and the like. The server 104 may determine whether to grant the service request 202 based on the information and send the service response 206 to the AAA server 106. The AAA server 106 may determine, based on the service response 206, whether the server 104 approved or denied the service request 202.

If a determination is made that the access request is approved, at 810, the client device may provided credentials to enable the client device to sign requests (e.g., connection requests) to the service provider, at 812. For example, the client device may be provided a key (or other type of credential) to enable the client device to sign requests to connect to the service.

At 814, the credentials may be provided to the service provider to enable the service provider to validate requests (e.g., from client devices) to access the service. For example, the service provider may be provided the key (or other type of credential) that was provided to the client device to enable the service provider to validate requests to connect to (e.g., utilize) the service provided by the service provider.

If a determination is made that the access request is not approved, at 810, the access request may be denied, at 816. For example, if a determination is made that the client device was reported lost, stolen, or otherwise compromised, the access request may be denied and protective actions (e.g., blacklisting the client device) may be performed.

The various techniques described above are assumed in the given examples to be implemented in the general context of computer-executable instructions or software, such as program modules, that are stored in computer readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A global authentication, authorization, and accounting (AAA) server, comprising:
   one or more processors; and
   one or more non-transitory computer readable media storing instructions that are executable by the one or more processors to perform acts comprising:
   receiving a first service request from a client device, the first service request requesting access to a service provided by a server, the first service request including a client signature added by a network interface controller of the client device that monitors outgoing data sent from the client device, the client signature based at least in part on a client identifier embedded in the network interface controller, wherein attempting to modify the client identifier causes the client device to be rendered inoperable;

authenticating the client device;

determining that the client device is excluded from a blacklist that includes banned devices, the blacklist based at least in part on determining a number of denials, by the server, of previous requests for the service;

sending an access request to the server, the access request including information associated with the first service request from the client device;

receiving a service response from the server, the service response indicating that the first service request from the client device was approved by a provider of the service; and enabling the client device to access the service based at least in part on the service response indicating that the first service request was approved.

2. The global AAA server of claim 1, the acts further comprising:

receiving, from the client device, a connection request to connect to the service, the connection request signed using a private key;

sending the connection request to the server;

determining that the server approved the connection request; and notifying the client device that the connection request was approved.

3. The global AAA server of claim 2, the acts further comprising:

receiving a server log from the server indicating that the server approved the connection request from the client device.

4. The global AAA server of claim 1, wherein before sending the access request to the server the acts further comprise:

determining that the client device is permitted to access the server; and sending the access request to the server.

5. The global AAA server of claim 1, wherein the first service request from the client device is approved by the server based at least in part on the client signature associated with the first service request.

6. One or more non-transitory computer readable media storing instructions that are executable by one or more processors to perform acts comprising:

receiving a registration request to register a service, the registration request signed using a server signature that is based at least in part on a server identifier embedded in a network interface controller of a server hosting the service, the network interface controller including logic to render the server inoperable based at least in part on detecting an attempt to modify the server identifier;

determining that the server is a trusted device based at least in part on the server signature;

registering the service;

receiving, from a client device, a service request requesting permission to access the service, the service request signed using a client signature that is based at least in part on a client identifier embedded in a network interface controller of the client device;

determining that the client device is excluded from a blacklist that includes banned devices, the blacklist based at least in part on determining a number of denials, by the server, of previous service requests for the service; and sending the service request to the server hosting the service.

7. The one or more non-transitory computer readable media of claim 6, the acts further comprising:

determining that the server has approved the service request; and sending a server fleet identifier to the client device, the server fleet identifier enabling a plurality of client devices associated with a client fleet identifier to access one or more services provided by a server fleet associated with the server fleet identifier.

8. The one or more non-transitory computer readable media of claim 7, the acts further comprising:

receiving, from the client device, a connection request to connect to the service, the connection request signed using the client signature;

sending the connection request to the server;

determining that the server has approved the connection request; and enabling the client device to connect to the service.

9. The one or more non-transitory computer readable media of claim 8, wherein the server approves the connection request from the client device based at least in part on authenticating the client signature included in the connection request.

10. The one or more non-transitory computer readable media of claim 8, wherein enabling the client device to connect to the service comprises providing, to the client device, a network address for connecting to the service.

11. The one or more non-transitory computer readable media of claim 8, the acts further comprising:

generating and storing a client log after the client device sends the connection request;

retrieving a server log from the server after the server approves the connection request; and comparing the client log with the server log to determine whether the client device is misusing the server.

12. The one or more non-transitory computer readable media of claim 6, wherein:

the server identifier is embedded in a firmware of a network interface controller component of the server; and the client identifier is embedded in a firmware of a second network interface controller component of the server.

13. A method, comprising:

under control of one or more processors configured with specific instructions, the method comprising:

registering, at a global authentication, authorization, and accounting (AAA) server, at least one service provided by a server fleet comprising one or more servers;

sending, to a service provider associated with the server fleet, a service request requesting permission for a client device of a client fleet to connect to the at least one service, the service request including a client signature that is based at least in part on a client identifier embedded in a firmware of the client device, wherein the firmware of the client device includes logic to render the client device inoperable based at least in part on detecting an attempt to modify the client identifier; and determining that the service provider has approved the service request;

providing client credentials including a client key to the server fleet to enable each server of the server fleet to authenticate communications signed by each client device; and providing server credentials including a server key to the client fleet to enable each client device of the client fleet to authenticate communications signed by each server.

14. The method of claim 13, wherein registering the service hosted by the server comprises:
    receiving a registration request from the server to register the at least one service, the registration request including a server signature based at least in part on a server identifier that is embedded in a firmware of the server;
    determining that the server is authorized to provide the at least one service based at least partly on the server signature; and
    registering the service hosted by the server.

15. The method of claim 13, wherein the server determines whether to approve the service request based at least in part on the client signature included in the service request.

16. The method of claim 13, wherein the service request is received from the client device before the service request is sent to the server.

17. The method of claim 13, wherein the client signature is automatically added by a firmware of a network interface controller of the client device.

18. The method of claim 13, the method further comprising:
    receiving a connection request from the client device, the connection request requesting a connection to the at least one service, the connection request including the client signature.

19. The method of claim 13, the method further comprising:
    receiving a first connection request from the client device, the first connection request requesting a connection to a first particular service of the at least one service, the first connection request signed using the client signature;
    granting the first connection request based at least in part on successfully authenticating the client signature, and in part on determining that the client device is authorized to use the first particular service;
    receiving a second connection request from the client device, the second connection request requesting a connection to a second particular service of the at least one service, the second connection request signed using the client signature; and
    denying the second connection request based at least in part on determining that the client device is not authorized to use the second particular service.

20. The method of claim 19, the method further comprising:
    adding a client log based at least in part on determining that the client device accessed the at least one service;
    receiving a server log from the server, the client log and the server log including information associated with the connection to the at least one service; and
    determining, based on an analysis of both the client log and the server log that the client device is abusing the connection to the at least one service.

* * * * *